US008689837B1

(12) United States Patent  (10) Patent No.: US 8,689,837 B1
Smith  (45) Date of Patent: Apr. 8, 2014

(54) LOW PROFILE DOWNSPOUT EXTENSION AND LANDSCAPE DRAINAGE ASSEMBLY

(76) Inventor: Jeffrey E. Smith, Alpharetta, GA (US)

(*) Notice: Subject to any disclaimer, the term of this patent is extended or adjusted under 35 U.S.C. 154(b) by 866 days.

(21) Appl. No.: 12/869,907

(22) Filed: Aug. 27, 2010

Related U.S. Application Data

(60) Provisional application No. 61/285,477, filed on Dec. 10, 2009.

(51) Int. Cl.
  *F16L 11/00* (2006.01)
(52) U.S. Cl.
  USPC ............ 138/118; 138/109; 138/121; 138/173; 285/226; 285/179; 285/903; 137/615
(58) Field of Classification Search
  USPC .............. 138/118, 119, 121, 122, 109, 173; 285/226, 183, 179; 239/197, 208, 547; 137/615
  See application file for complete search history.

(56) References Cited

U.S. PATENT DOCUMENTS

| 455,910 | A | 7/1891 | Gordon |
| 577,362 | A | 2/1897 | Ettlinger |
| 749,232 | A | 1/1904 | Shaw |
| 1,033,195 | A | 7/1912 | Robinson |
| 1,239,373 | A | 9/1917 | Farmer et al. |
| 1,273,200 | A | 7/1918 | Symonds |
| 2,116,863 | A | 5/1938 | Dinley |
| 2,397,655 | A | 4/1946 | Francis |
| 2,586,145 | A | 2/1952 | Breuer et al. |
| 2,655,408 | A | 10/1953 | Williams |
| 2,661,225 | A | 12/1953 | Lyon |
| 2,814,529 | A | 11/1957 | Arnt |
| 2,975,805 | A | 3/1961 | Horn |
| 3,076,669 | A | * 2/1963 | Schlein ............ 285/179 |
| 3,861,419 | A | 1/1975 | Johnson |
| 3,920,271 | A | * 11/1975 | Bluestone ........ 285/148.22 |
| 3,966,121 | A | 6/1976 | Littman |
| 4,112,568 | A | 9/1978 | Hale |
| 4,247,136 | A | 1/1981 | Fouss et al. |
| 4,273,367 | A | 6/1981 | Keeney et al. |
| 4,480,855 | A | 11/1984 | Rosenbaum |
| 4,575,133 | A | 3/1986 | Nattel |
| 4,615,153 | A | 10/1986 | Carey |
| 4,688,720 | A | 8/1987 | MacDonald |
| 4,801,377 | A | 1/1989 | Bolt |
| 4,904,113 | A | * 2/1990 | Goddard et al. ...... 405/45 |
| 5,031,426 | A | 7/1991 | Wilson |
| 5,150,930 | A | 9/1992 | Petty et al. |
| 5,332,270 | A | 7/1994 | Petty et al. |
| 5,358,006 | A | 10/1994 | Sweers |
| 5,358,007 | A | 10/1994 | Carlberg |

(Continued)

*Primary Examiner* — Patrick F Brinson
(74) *Attorney, Agent, or Firm* — Myers Bigel Sibley & Sajovec, PA

(57) ABSTRACT

A downspout extension has a low-profile to direct rainwater away from a building. A transition adapter can be used to transition from a generally circular or square cross-section of a downspout to a low-profile cross-section of a corrugated duct of the extension. The extension can include internal supports to withstand being stepped on and can have a generally rectangular or trapezoidal cross-section with a longer width than height. The corrugated duct can also be comprised of integrated accordion corrugation sections and transverse non-collapsible ribs to give the corrugated duct extension greater flexibility. The extension can be connected to a downspout using a flexible elbow duct, a downspout connector, and a downspout adapter. The transition adapter of the extension can also be connected directly to a downspout.

32 Claims, 16 Drawing Sheets

(56) References Cited

U.S. PATENT DOCUMENTS

| | | |
|---|---|---|
| 5,375,891 A | 12/1994 | Sicotte |
| 5,387,016 A | 2/1995 | Joseph et al. |
| 5,511,829 A | 4/1996 | Sicotte et al. |
| 5,658,092 A | 8/1997 | Sweers |
| 5,673,519 A | 10/1997 | McCaughan |
| 5,682,925 A * | 11/1997 | Seckel .................. 138/118 |
| 5,709,051 A | 1/1998 | Mazziotti |
| 5,752,784 A * | 5/1998 | Motz et al. .................. 405/37 |
| 5,813,701 A | 9/1998 | Noble |
| 5,823,580 A | 10/1998 | Ungerecht |
| 5,862,632 A | 1/1999 | Zima |
| 5,911,540 A * | 6/1999 | Adamson .................. 405/43 |
| 5,915,735 A | 6/1999 | Noble |
| 6,007,110 A | 12/1999 | Amatsutsu |
| 6,041,825 A | 3/2000 | Smith et al. |
| 6,202,358 B1 | 3/2001 | Janesky |
| 6,223,777 B1 * | 5/2001 | Smith et al. .................. 138/109 |
| 6,612,075 B1 | 9/2003 | Knoop et al. |
| D514,670 S | 2/2006 | Handley |
| 7,017,614 B2 * | 3/2006 | Handley .................. 138/109 |
| 7,017,949 B2 | 3/2006 | Luft et al. |
| 7,677,271 B2 | 3/2010 | Boettner et al. |
| 7,918,247 B2 * | 4/2011 | Coleman .................. 138/137 |
| D666,701 S * | 9/2012 | Smith .................. D23/269 |
| 2005/0155660 A1 | 7/2005 | Handley |
| 2007/0046021 A1 * | 3/2007 | Crawford .................. 285/226 |
| 2008/0023959 A1 * | 1/2008 | Crawford .................. 285/226 |
| 2010/0037972 A1 * | 2/2010 | Palmeri .................. 138/121 |

* cited by examiner

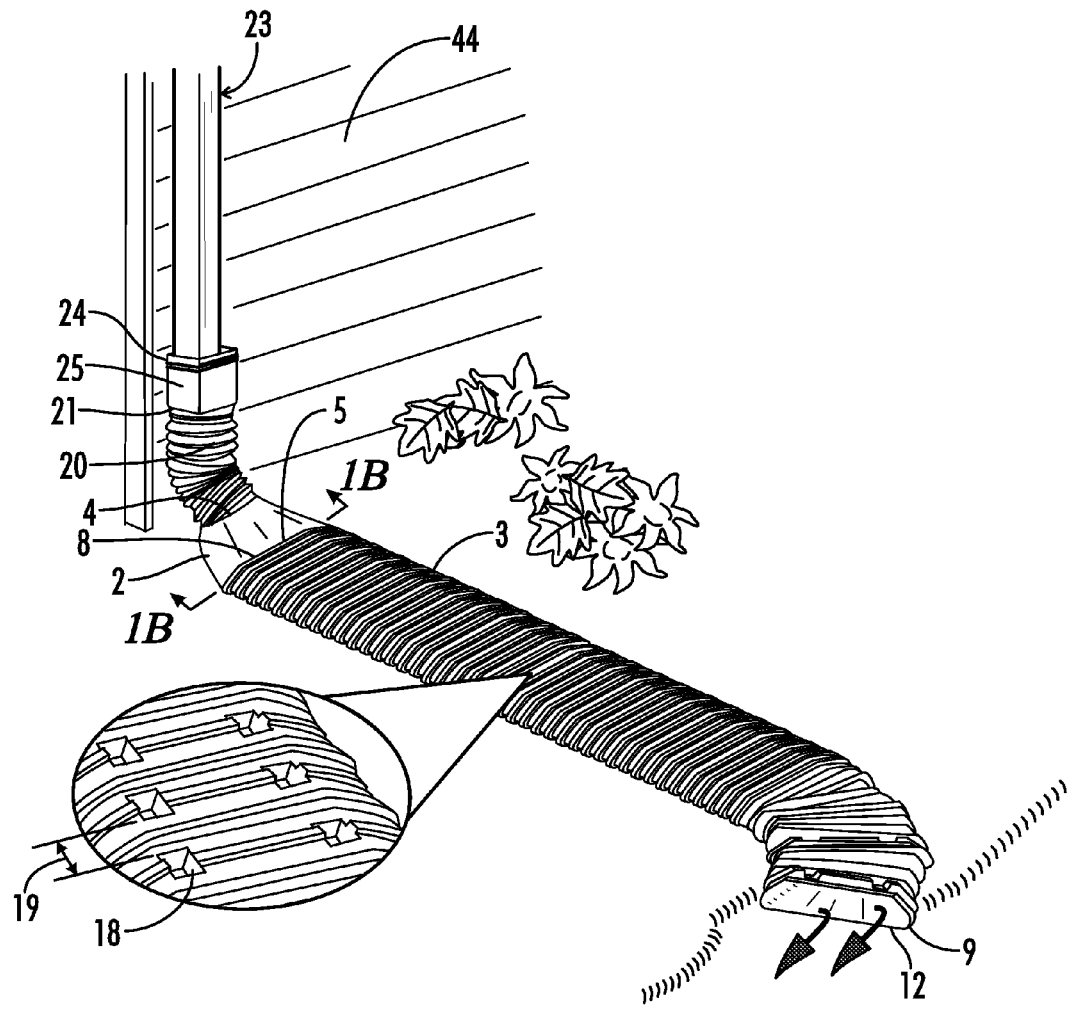
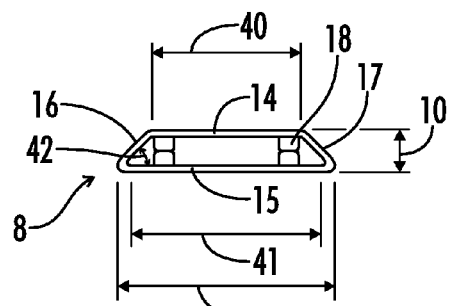
FIG. 1
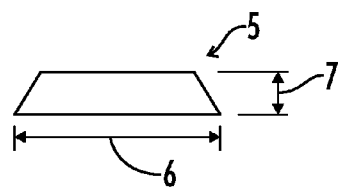
FIG. 1A
FIG. 1B

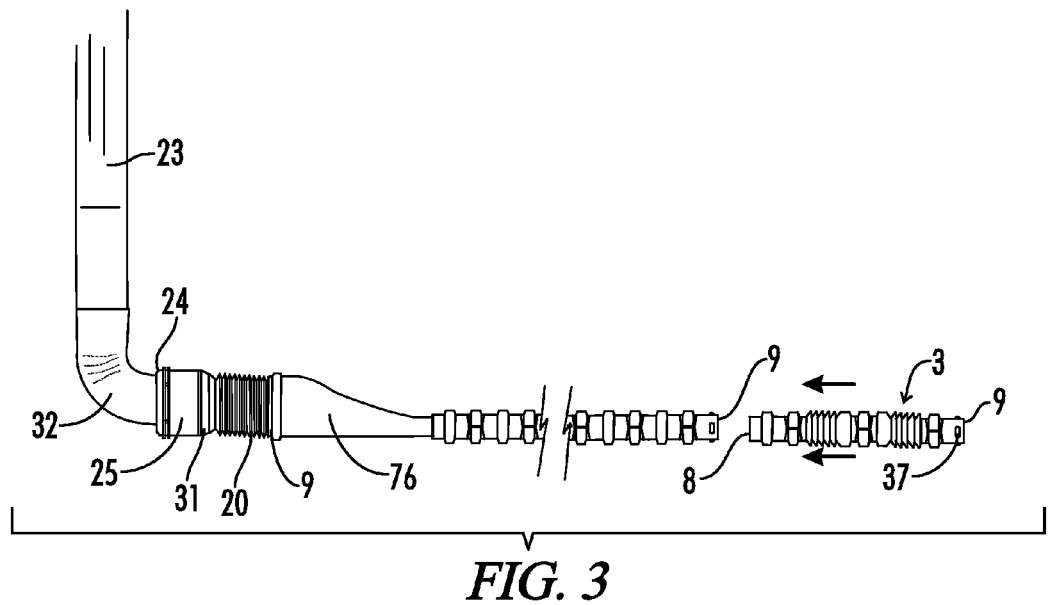
*FIG. 3*
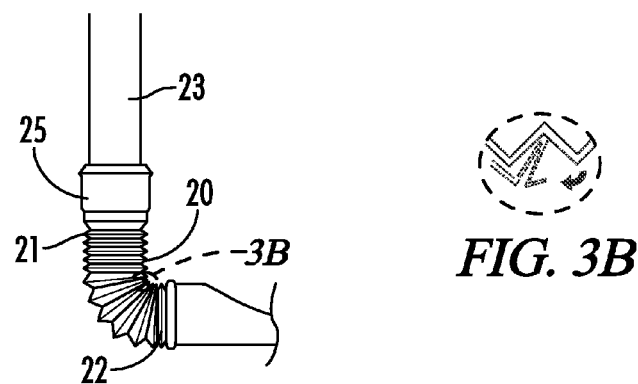
*FIG. 3A*
*FIG. 3B*

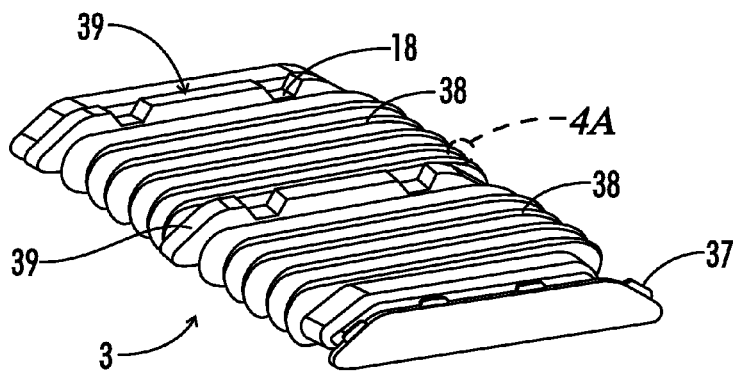
FIG. 4
FIG. 4A
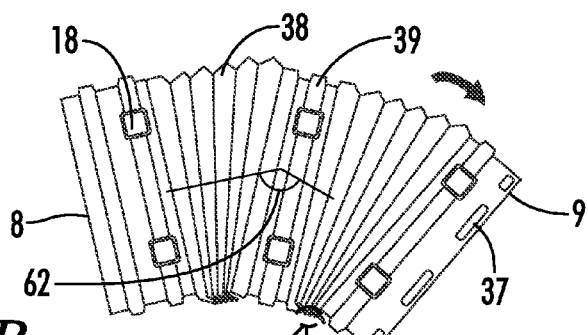
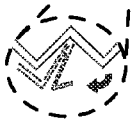
FIG. 4B
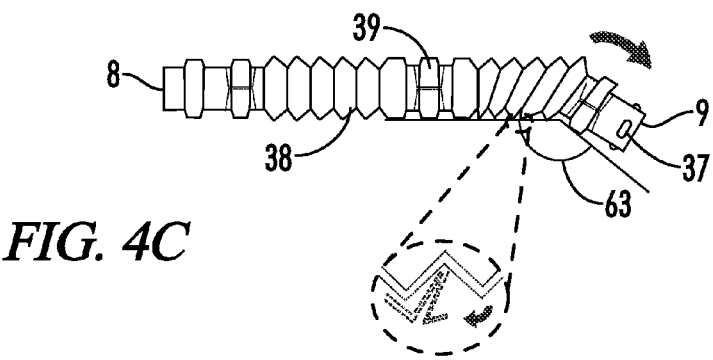
FIG. 4C

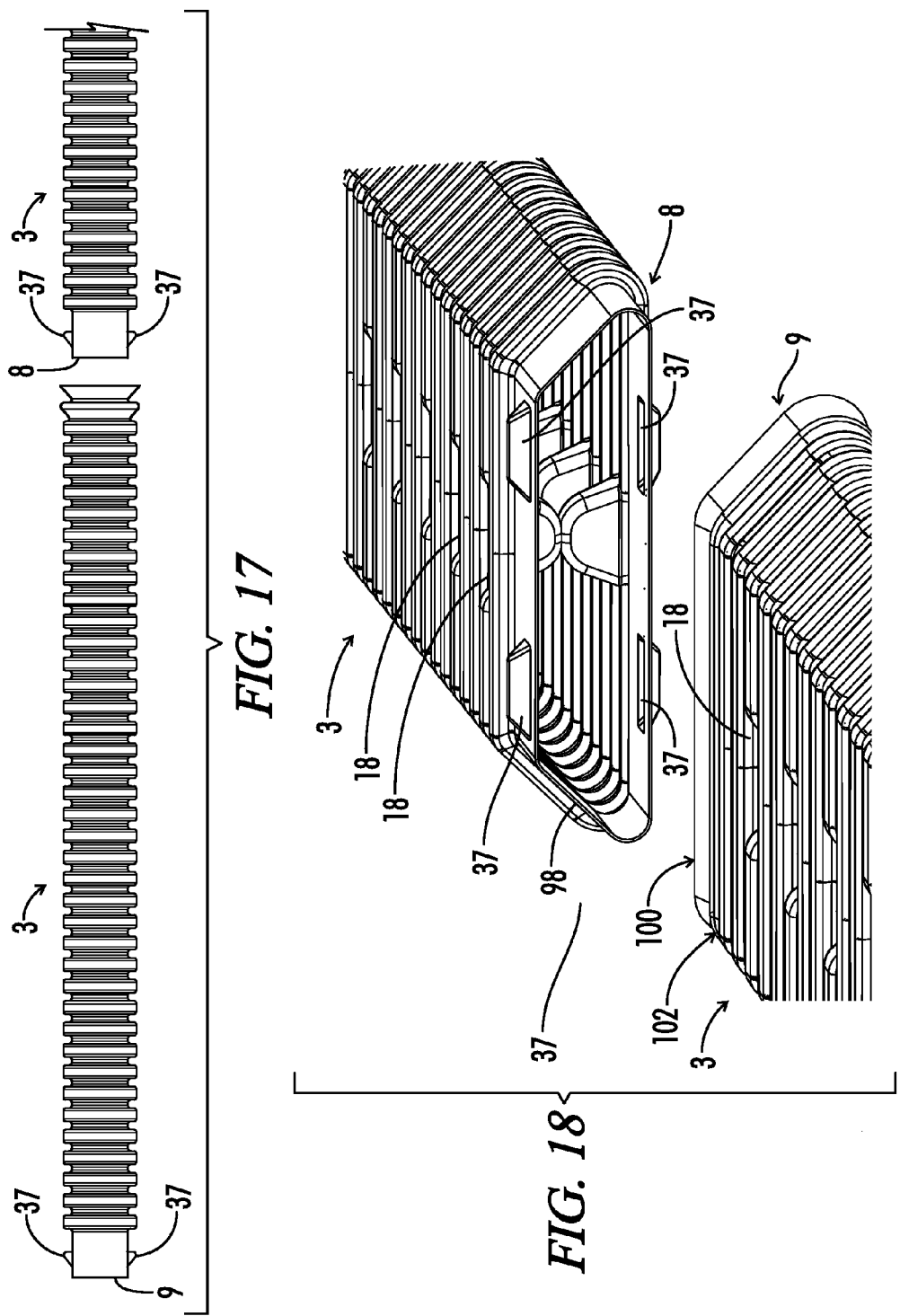

LOW PROFILE DOWNSPOUT EXTENSION AND LANDSCAPE DRAINAGE ASSEMBLY

CROSS-REFERENCE TO RELATED APPLICATIONS

This application is a non-provisional of U.S. Patent Application Ser. No. 61/285,477, filed Dec. 10, 2009, entitled "Low Profile Downspout Extension And Landscape Drainage Assembly", which is incorporated by reference.

FIELD OF THE INVENTION

The present invention generally relates to gutter downspouts and landscape drainage as well as landscape maintenance in general.

DESCRIPTION OF THE PRIOR ART

For years buildings have been equipped with gutters and downspouts for removing water from roofs and away from foundations. Typically there are a number of downspouts connected to the gutters of the building. At the exit end of these downspouts a fixed angle elbow connector is typically utilized to direct the rain water along the ground in the direction away from the side of the building. This results in the rain water being directed only a short distance away from the building often resulting in leaks and cracks and other types of water damage to the foundation of the building.

Another piece of downspout extending on the ground away from the building can be connected to the elbow to exhaust the water further away from the building. However, this conventionally is restricted to a linear direction and creates an obstacle for maintaining the landscape and walking around the perimeter of the building.

These gutter systems and downspouts are also installed underneath decks where under deck drainage systems are needed. These areas have presented some of the same problems that roof drainage systems have presented as well as also being in a position that can cause a tripping hazard if installed on walkway areas.

Water draining and runoff from the surrounding area must be taken into account when developing new land and constructing buildings and building parking lots. Many times drainage pipes in culverts are installed to move rain water away from these developed areas. Known problems exist when rock is below the surface of the ground. It requires increased labor and cost to dig up rock or dig around the rock in order to install buried drainage pipe.

Some conventional gutter systems use solid gutter covers to prevent leaves and debris from clogging the system and preventing the proper flow of water to the downspouts. These solid gutter covers allow the water to pass through and into the gutter while the leaves and debris wash over the top of the surface. However, sometimes on buildings with two tiered roofs with a solid gutter cover system a downspout on the upper roof is set up to direct water onto the lower roof and the lower roof guttering system. During a heavy rain, water from the upper roof directed to the lower roof combined with the rain falling on the lower roof can easily exceed the capacity of the solid gutter cover system on the lower roof downspout causing water to flow over the solid gutter and fall directly adjacent the building. This can cause additional drainage and foundation issues to the building.

Attempts have been made in the art to provide a downspout extension that directs water away from a building without simply adding another piece of downspout material. Some examples of these attempts are the bendable corrugated plastic pipe and adapters that are connected to a downspout, splash blocks and downspout pipe extensions.

One example is U.S. Pat. No. 5,358,006 issued to Sweers, which is an open trough extension that cannot be buried. The Sweers patent allows the water to run across the ground in a canal. Because the trough is open it must be clear of debris to allow the water to flow.

Another example is the U.S. Pat. No. 6,041,825 issued to Smith and Nobel, which includes a bendable corrugated pipe downspout extension that can be buried in an attempt to hide the downspout extension. This requires digging often around shrubs and trees which can be very labor intensive due to the roots and can often damage and kill the shrubs and trees. The roots of the shrubs and trees can also grow and penetrate through the buried downspout extension walls, which can lead to clogging of the downspout extension, prevent proper drainage of rain water, and produce leaking near the foundation of the house or building.

BRIEF SUMMARY OF THE INVENTION

The present invention provides a flexible low profile downspout extension and landscape drainage apparatus. The draining apparatus includes a transition adapter for connection to a downspout and an exit end with a larger width than height so that the exit end forms an oblong shape. The transition adapter exit end can be connected to a corrugated duct where the connected ends have the same width and height as each other so that they can be closely received within one another. The corrugated duct then has an exit end or an outlet end which allows water to be directed further away from the house or building.

Another embodiment includes the draining apparatus with a corrugated duct and a transition adapter to be fit to the end of the downspout as well as a plurality of supports inside the corrugated duct to withstand vertical forces in order to maintain the separation between the duct top portion and bottom portion. The invention allows draining or extending the downspout by attaching a transition adapter to a downspout where the transition adapter has an exit end with a larger width than height then providing a corrugated duct to be attached to the exit end of the transition adapter allowing fluid transfer from the transition adapter to the corrugated duct. The corrugated duct is then laid across a surface and supported internally to withstand vertical forces in order to maintain the shape of the duct.

BRIEF DESCRIPTION OF THE DRAWINGS

FIG. 1 is a perspective view of a flexible low profile downspout extension with enlarged views of the transverse non-collapsible ribs and inward reinforcing supports of an embodiment. The drawing shows an embodiment attached to the downspout of a building.

FIG. 1A is an inlet end of the corrugated duct.

FIG. 1B is an exit end of the transition adapter.

FIG. 3 is a side view of an embodiment of the invention connected to a downspout which has a fixed elbow attached.

FIG. 3A is an enlarged side view of an embodiment of the invention using a flexible elbow duct to connect to the downspout without the fixed elbow duct attached.

FIG. 3B is an enlarged partial cross-sectional view of FIG. 3A showing movement of the flexible elbow duct.

FIG. 4 is a perspective view of an embodiment showing accordion corrugation sections separated by transverse noncollapsible ribs.

FIG. 4A is an enlarged view of an accordion corrugation section.

FIG. 4B is a top view of the accordion corrugation section showing the ability to adjust the angle of the corrugated duct.

FIG. 4C is a side view of the accordion corrugation sections showing the ability to adjust the angle of the outlet in a vertical manner.

FIG. 17 is a side view of an embodiment of corrugated ducts disassembled.

FIG. 18 is a partial perspective view of an embodiment of corrugated ducts disassembled showing examples of latching members, locking rib, and collars.

DETAILED DESCRIPTION OF THE INVENTION

Figures 2, 2A:
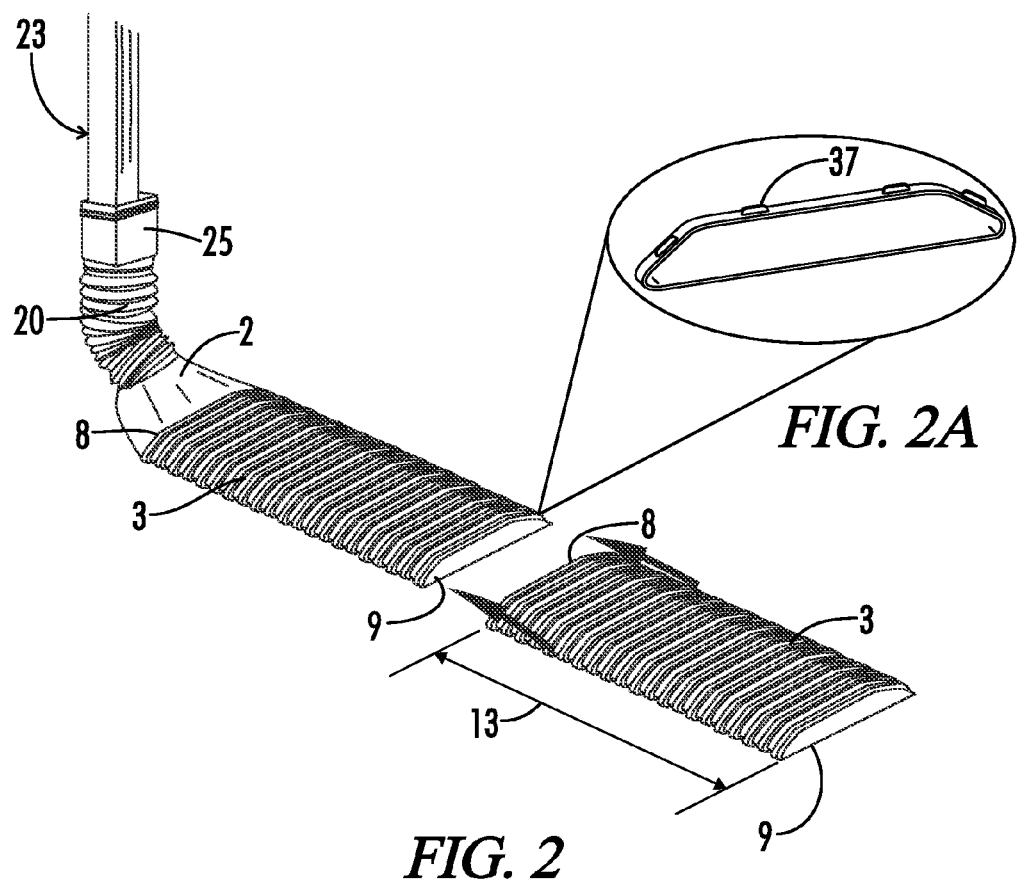
FIG. 2 is a perspective view of an embodiment of the invention showing the connection of multiple corrugated ducts end to end.
FIG. 2A is an enlarged detailed view shows an embodiment of the invention allowing the corrugated ducts to connect.

A draining apparatus 1 is shown in FIG. 1 comprising a transition adapter 2 and a duct 3, which can be corrugated. An embodiment of the transition adapter 2 has a receiving end 4 for connection to a downspout 23 or to the flexible elbow duct 20 of a downspout connector 25, and an exit end 5 having a width 6 and a height 7, shown in FIG. 1B, where the transition adapter exit end width 6 is larger than the transition adapter exit height 7.

The duct 3 has a first end 8 and a second end 9. As seen in FIG. 1A, the first end 8 has a height 10 and a width 11. The first duct end height 10 and first duct end width 11 each have dimensions to allow one of the transition adapter exit end 5 and the first duct end 8 can be closely received within the other. The second corrugated duct end 9 has an outlet 12.

An embodiment of the duct 3, which can be a corrugated duct, includes a corrugated duct first end width 11 that is at least three times larger than the corrugated duct first end height 10. Another embodiment of the draining apparatus 1 includes a corrugated duct 3 that has a length 13, best shown in FIG. 2, perpendicular to the corrugated duct first end width 11 and corrugated duct first end height 10. The duct width 11 and duct height 10 may be substantially uniform throughout the duct length 13. An embodiment of the draining apparatus 1 can also include a corrugated duct 3 made of plastic.

An embodiment of the draining apparatus 1 includes a corrugated duct 3 with a top portion 14, bottom portion 15, two side portions 16 and 17, and at least one support 18. The two side portions 16 and 17 separate the top portion 14 and bottom portion 15 to create the duct height 10. The support 18 can be located inside the corrugated duct 3 to withstand vertical forces in order to maintain the duct height 10, separating the duct top portion 14 and the duct bottom portion 15.

In an embodiment of the draining apparatus 1, the support 18 can be integrally formed with the corrugated duct 3. The support 18 can extend from the corrugated duct bottom portion 15, or from the corrugated duct top portion 14. Another embodiment of the draining apparatus 1 can include supports 18 extended from both the corrugated duct top portion 14 and the corrugated duct bottom portion 15 where each support 18 extended from the top portion 14 is complemented by an opposing support 18 extended from the bottom portion 15. An embodiment of the draining apparatus 1 can include a corrugated duct 3 where the supports 18 are intermittently spaced along the corrugated duct length 13. These supports 18 can be positioned proximate to the center of the corrugated duct 3, as best seen in FIGS. 14, 15, 15A, and 18. Another embodiment can include multiple supports 18 that are positioned in groups of at least two supports 18, with each group of two supports 18 being transversely aligned with the corrugated duct width 11 and another group of two supports 18 to form multiple rows of supports 18, as best seen in FIGS. 1, 1a, 4, 4A, and 17. The single or multiple rows of supports 18 can have a single support 18 at each location or have complementary or opposing top and bottom supports 18 at each location.

The supports 18 can allow the corrugated duct 3 to withstand a pressure loading of up to about 8.5 PSI on the top portion 14 without substantial plastic deformation in order to maintain the shape of the corrugated duct 3 when an adult weighing between about 150 lbs and 300 lbs steps on the corrugated duct 3 with a shoe footprint area of between about 36 and 65 square inches. Another embodiment of the corrugated duct 3 with supports 18 allows the corrugated duct 3 to withstand a pressure loading on the top portion 14 of at least about 2.3 PSI without substantial plastic deformation. In an embodiment of the corrugated duct 3, the supports 18 can be separated from one another by an interval length 19 (see enlarged view in FIG. 1) of less than about 5 inches to prevent stepping on the corrugated duct 3 between supports 18.

A cross-section of an embodiment of the corrugated duct 3 is shown in FIG. 1A where the corrugated duct top portion 14 has a width 40 and the corrugated bottom portion 15 has a width 41. The top portion width 40 is less than the bottom portion width 41 so that the side portions 16 and 17 make an acute angle 42 with the bottom portion 15. This embodiment can further reduce the tripping hazard presented by the corrugated duct 3.

The transition adapter can have multiple shapes to facilitate the connection between the corrugated duct 3 and a downspout 23. For example, while the transition adapter 2 or 76 can be shaped to convert the cross section size of the exit end of the downspout 23 to the size of the height 10 and width 11 of the first end 8 of the corrugated duct 3, these transition adapters 2 and 76 vary in the footprint length of this conversion. Both transition adapters 2 or 76 can include latching members 37A that can be positioned on a collar 106 to pass through the first end 8 of the corrugated duct 3 and engage the locking rib 102 to secure the transition adapter and corrugated duct 3 together. Additionally the transition adapters can include supports 18 used to maintain the open cross-section of the end 4.

Figure 6:
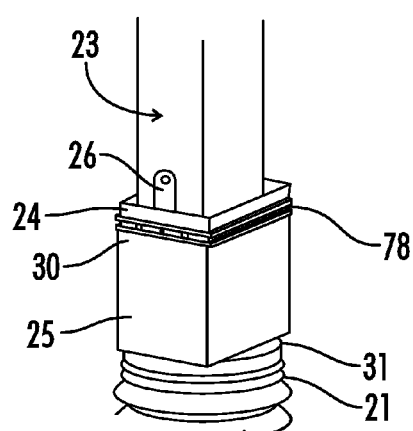
FIG. 6 is the downspout connector and removable downspout adapter of an embodiment of the invention shown connected to the end of a downspout.
Figure 6A:
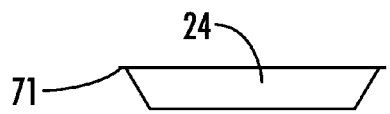
FIG. 6A is a side view of the removable downspout adapter.
Figure 6B:
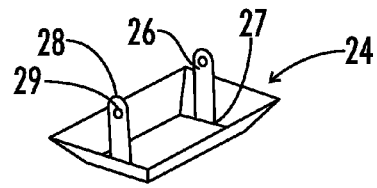
FIG. 6B is a perspective view of the removable downspout adapter.

Referring again to FIG. 1, an embodiment of the draining apparatus 1 can further comprise a removable downspout adapter 24, a downspout connector 25, and a flexible elbow duct 20 to be used to attach the transition adapter 2 to the end of a downspout 23. FIG. 6 shows a close up view of an embodiment of the draining apparatus 1 connected to the downspout 23. The removable downspout adapter 24 has a plurality of flexible attachment members 26, each attachment member 26 has a first end 27 connected to the removable downspout adapter 24 and a second end 28 having a hole 29 for fastening the downspout adapter 24 to the downspout 23. The downspout connector 25 has a first end 30 and a second end 31. The first downspout connector end 30 is configured to mate with the removable downspout adapter 24. The flexible elbow duct 20 has a first end 21 and a second end 22. The first flexible elbow duct end 21 is configured to mate with the second downspout connector end 31 and the second flexible elbow duct end 22 is configured to mate with the transition adapter receiving end 4 as shown in FIGS. 1, 3 and 3B. The removable downspout adapter 24, downspout connector 25, and flexible elbow duct 20 can also be molded and/or manufactured together as a single unit or separately as individual components.

FIG. 3 shows an embodiment of the draining apparatus 1, using a removable downspout adapter 24, a downspout connector 25, and a flexible elbow duct 20 to connect the transition adapter receiving end 4 to the end of a fixed elbow downspout 32 or a downspout 23 directly shown in FIG. 3A.

FIGS. 2, 17, and 18 show embodiments of the draining apparatus 1 where the corrugated duct first end 8 and the corrugated duct second end 9 can be closely received one within the other to allow a plurality of corrugated ducts 3 to be joined together. This allows the corrugated duct 3 to be extended a greater distance. The corrugated ducts 3 can have latching members 37 located on either the corrugated duct first end 8 or the corrugated duct second end 9 to allow the ends of the ducts 8 and 9 to more securely be received within one another. The latching members preferably extend outside the perimeter of the corrugated duct outlet 12. In an embodiment, the latching members 37 are positioned on a collar 98 on the second end 9 and the first end 8 includes a flared collar 100 that is sized to extend around the second end 9 and the latching members 37. Behind the flared collar 100 is a locking rib 102 positioned to engage the latching members 37 on the collar 98 to removable secure the sections of the corrugated ducts 3 together. The latching members 37 can be positioned on the top bottom and or sides of the collar 98.

FIG. 4 shows the corrugated duct 3 of an embodiment of the draining apparatus 1 including a plurality of accordion corrugation sections 38 and transverse non-collapsible ribs 39. Each accordion corrugation section 38 can be vertically and/or horizontally flexible to allow the section of the corrugated duct 3 to be adjusted. The transverse non-collapsible ribs 39 can be integral to the corrugated duct 3 to aid in maintaining the shape of the corrugated duct 3 with each transverse non-collapsible rib 39 separating adjacent accordion corrugation sections 38. FIG. 4B shows the accordion corrugation section 38 with the accordion corrugation section 38 adjusted to make a horizontal angle 62 and FIG. 4C shows the accordion corrugation section 38 with the accordion corrugation section 38 adjusted to make a vertical angle 63 with the ground. In addition, FIG. 4 also shows an embodiment of the corrugated duct 3 where the supports 18 are integrally formed with the transverse non-collapsible ribs 39. This configuration can allow the support 18 to more easily maintain the shape of the corrugated duct 3.

Figure 5:
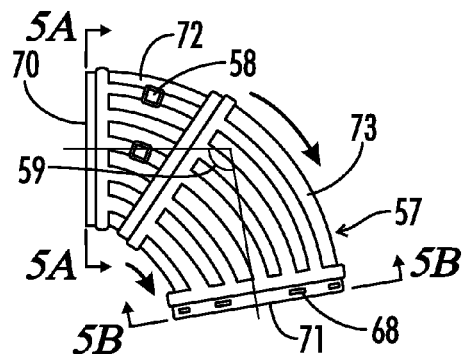
FIG. 5 is a top view of a sliding adjustable elbow.
Figure 5A:
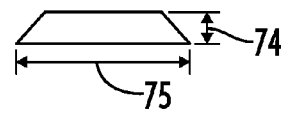
FIG. 5A is a side view of a sliding adjustable elbow inlet end.
Figure 5B:
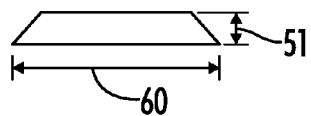
FIG. 5B is a side view of a sliding adjustable elbow outlet end.

FIG. 5 shows a sliding elbow duct 57 of an embodiment of the draining apparatus 1. The sliding elbow duct 57 can be made up of two interlocking plastic pieces 72 and 73 that can slide within one another to adjust the sliding elbow duct angle 59. The sliding elbow duct 57 has a first end 70 shown in FIG. 5A with a height 74 and a width 75 to allow the sliding elbow duct 57 to be connected to a corrugated duct second end 9. The sliding elbow duct 57 also has a second end 71 shown in FIG. 5B with height 51 and a width 60 to allow the second end 71 to be connected to a corrugated duct first end 8. Another embodiment of the sliding elbow duct 57 has a sliding elbow duct first end 70 and sliding elbow duct second end 71 that can connect to either the corrugated duct first end 8 or the corrugated duct second end 9. An embodiment of the sliding elbow duct 57 can also include latching members 68 to connect the corrugated duct 3 more securely. In addition, an embodiment of the sliding elbow duct 57 can have integrated supports 58 to maintain the shape of the sliding elbow duct 57.

Figure 7:
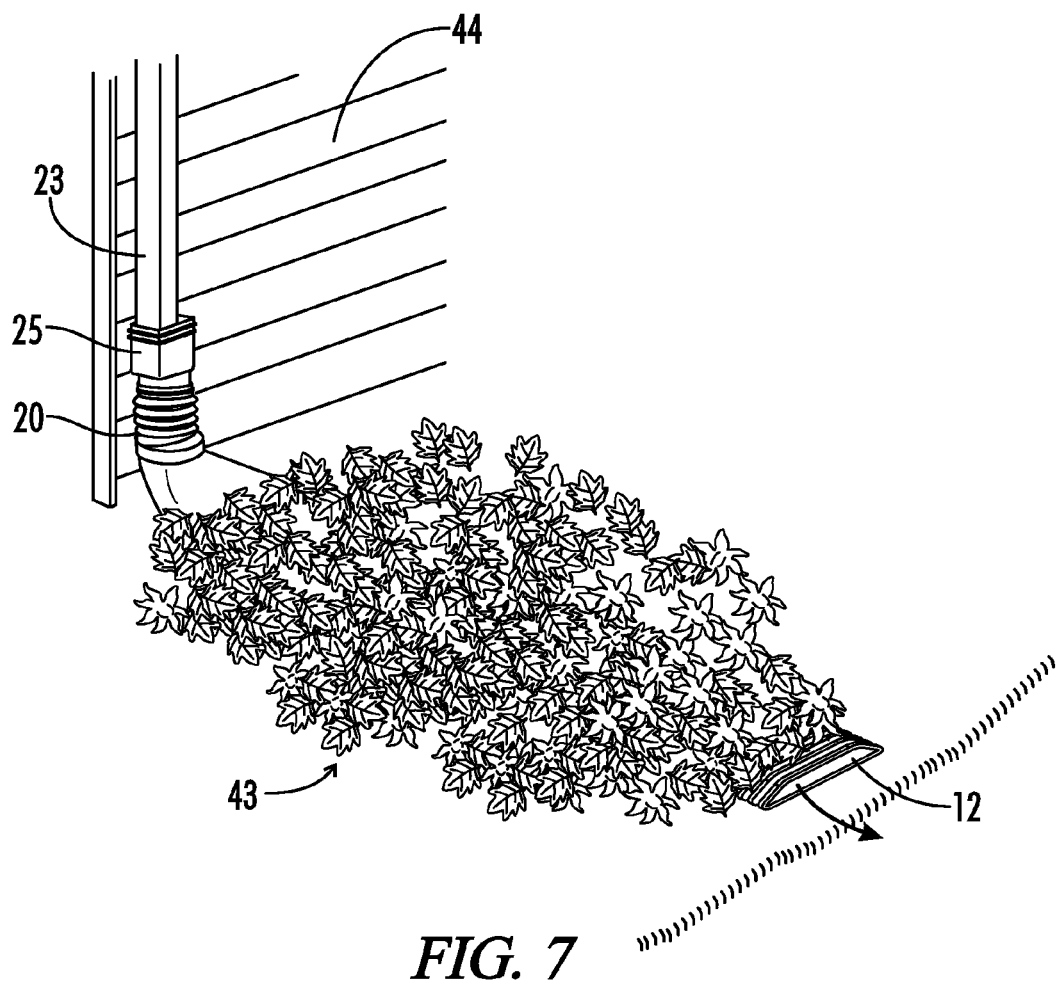
FIG. 7 shows an embodiment of the invention connected to the downspout of a building covered with landscape material.

FIG. 7 shows an embodiment of the draining apparatus covered with brush 43 attached to a downspout 23 of a building 44. The low profile nature of the draining apparatus 1 allows the draining apparatus 1 to be concealed by brush 43 and hidden out of the way. The corrugated duct outlet 12 can then be extended beyond the brush 43 to allow for an unblocked discharge of fluid.

Figure 8:
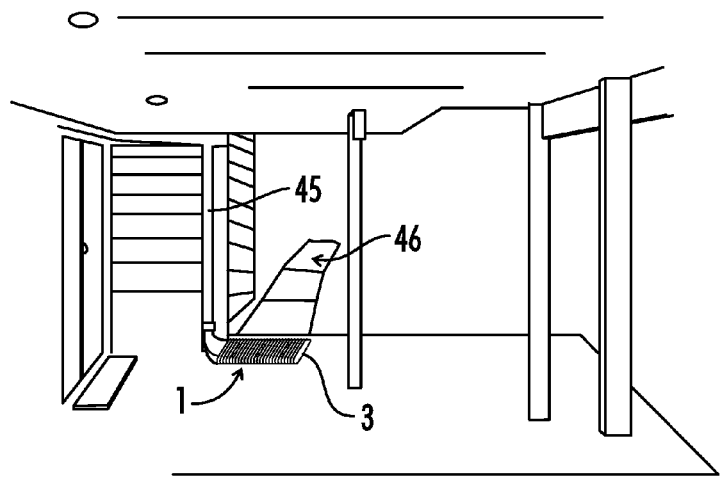
FIG. 8 shows an embodiment of the invention attached to the downspout underneath a deck.
Figure 8A:
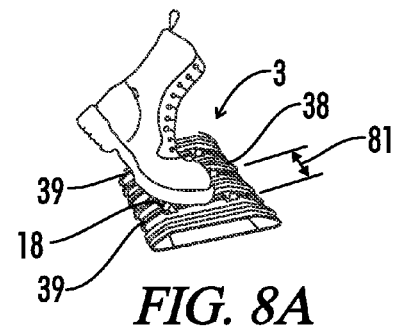
FIG. 8A shows detail of the embodiment of FIG. 8 with an example of a pressure load applied.

FIGS. 8-8A show an embodiment of the draining apparatus 1 attached to an under deck downspout 45 and extended across a walking path 46. An embodiment of the corrugated duct 3 is shown including integrated transverse non-collapsible ribs 39 and accordion corrugation sections 38. An embodiment of the corrugated duct 3 can include supports 18 integral to the transverse non-collapsible ribs 39.

An embodiment of the accordion corrugation section 38 can be compressed to reduce the interval length 81 between the supports 18 to less than about 5 inches. The accordion corrugation sections 38 can be compressed when placed in a walkway 46 to prevent stepping on the corrugated duct 3 between the supports 18. The supports 18 can allow the corrugated duct 3 to withstand a pressure loading of up to about 8.5 pounds per square inch (PSI) on the top portion 14 without substantial plastic deformation in order to maintain the shape of the corrugated duct 3 when an adult weighing between about 150 lbs and 300 lbs steps on the corrugated duct 3 with a shoe footprint area of between about 36 sq. in and 65 sq. in. Another embodiment of the accordion corrugation sections 38 with supports 18 can allow the corrugated duct 3 to withstand a pressure loading of at least about 2.3 PSI on the top portion 14 without substantial plastic deformation. An embodiment of each support 18 can withstand a compression force of up to about 300 lbs applied by an adult when stepping on a transverse group of supports 18 without substantial plastic deformation. Another embodiment of each support 18 can withstand a compression force of at least 75 lbs without substantial plastic deformation. The low profile nature of the corrugated duct 3 can also reduce the tripping hazard presented by the corrugated duct 3 placed in a walking path 46. It is noted that the transition adapter can have a vertically oriented first end 4 or a horizontally oriented first end 4 depending on the attachment of the transition adapter to the down spout 23 or downspout connector 25.

Figure 9:
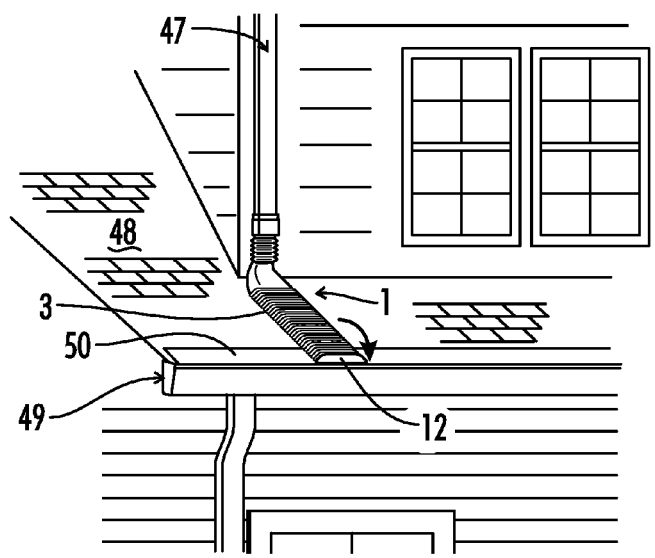
FIG. 9 is an embodiment of the invention attached to the downspout on an upper roof of a building.

FIG. 9 shows an embodiment of the draining apparatus 1 connected to an upper roof downspout 47 where the corrugated duct 3 can be placed on the surface of the lower roof 48. The corrugated duct outlet 12 can be placed to direct fluid into the lower roof gutter 49. The outlet end can also be placed directly in a lower roof gutter 49 that has a solid gutter cover 50 to release the fluid directly into the gutter 49 and bypassing the gutter cover 50.

Figure 10:
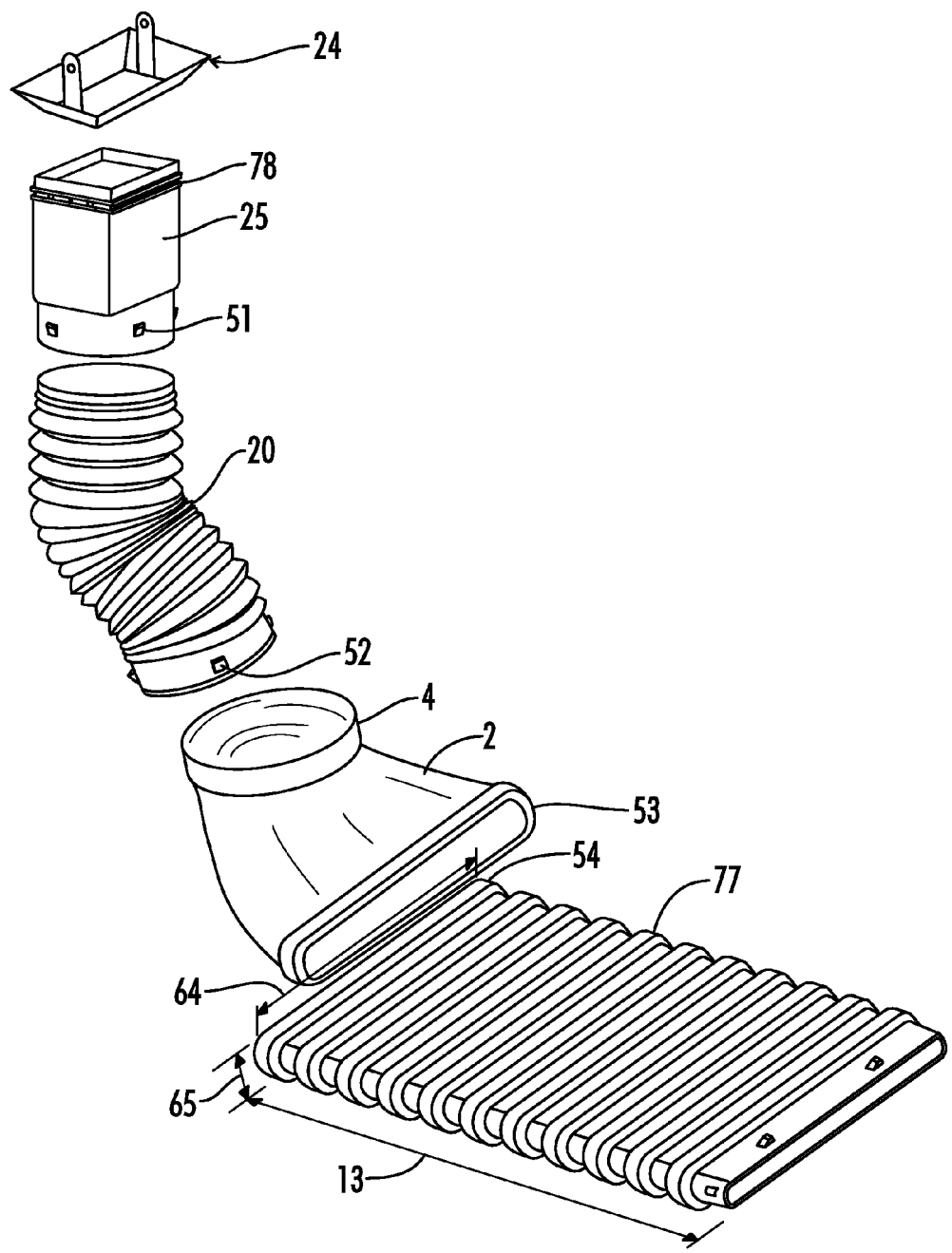
FIG. 10 is an embodiment of the invention in an assembly view.

An embodiment of the draining apparatus 1 is shown in FIG. 10 in an exploded view including a removable downspout adapter 24, a downspout connector 25, a flexible elbow duct 20, a transition adapter 2 or 76, and a corrugated duct 77. In an embodiment of the downspout connector 25, the downspout connector second end 31 has attachment hooks 51 for securely connecting the downspout connector 25 to the first end of the flexible elbow duct 21. In an embodiment of the flexible elbow duct 20, the second end 22 includes attachment hooks 52 to more securely connect to the transition adapter receiving end 4. Additionally, an embodiment of the draining apparatus 1 can have a transition adapter 2 or 76 and a corrugated duct 77, where the corrugated duct 77 has a first end 54 with a width 64 and a height 65 so the corrugated duct first end 54 can be snugly received within the transition adapter exit end 53. In a further embodiment of the draining apparatus 1, the corrugated duct width 64 and corrugated duct height 65 are substantially uniform throughout the corrugated duct length 13.

The corrugated duct can have alternate embodiments. For example, the corrugated duct 3A can have a substantially rigid configuration that allows little to no lateral movement with respect of the axis of the corrugated duct 3A. Alternately, the corrugated duct 3B can include sufficient flexibility to allow lateral movement with respect of the axis of the corrugated duct 3B.

Figure 11:
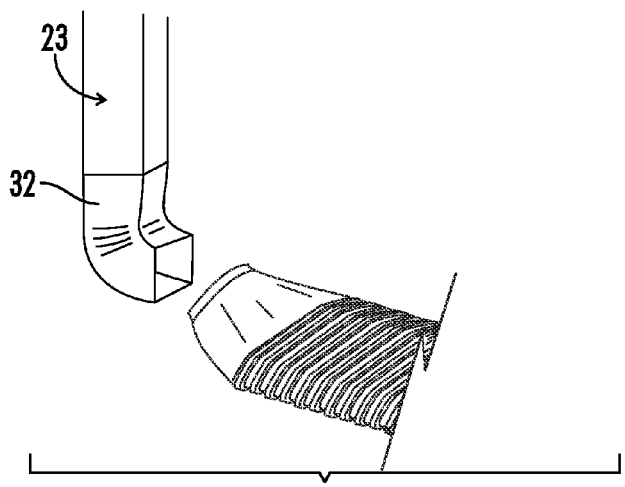
FIG. 11 is an embodiment of the invention showing the transition adapter ready to directly connect to a fixed elbow end of a downspout.
Figure 12:
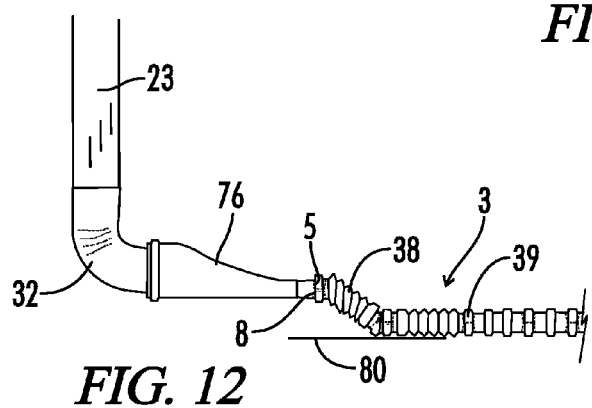
FIG. 12 is a side view of an embodiment of the invention with the transition adapter directly connected to the fixed elbow end of a downspout.

FIGS. 11 and 12 show an embodiment of the draining apparatus 1 including a transition adapter 2 or 76 and a corrugated duct 3. The transition adapter receiving end 4 can be sized to fit directly to the end of the downspout 23 with a fixed elbow end attached 32. An embodiment of the corrugated duct 3 shown in FIG. 12 can include accordion corrugation sections 38 and transverse non-collapsible ribs 39 that allow the corrugated duct 3 to more easily move from the transition adapter exit end 5 to a surface 80. This can further reduce the tripping hazard presented by the corrugated duct 3.

Figure 13:
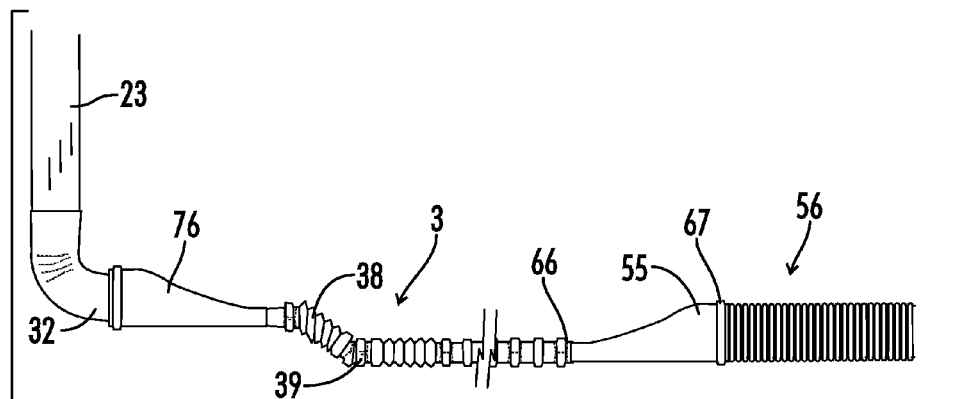
FIG. 13 is a side view of an embodiment of the invention with the transition adapter directly connected to the fixed elbow end of a downspout on one end and connected to a corrugated pipe on the other end.
Figure 14:
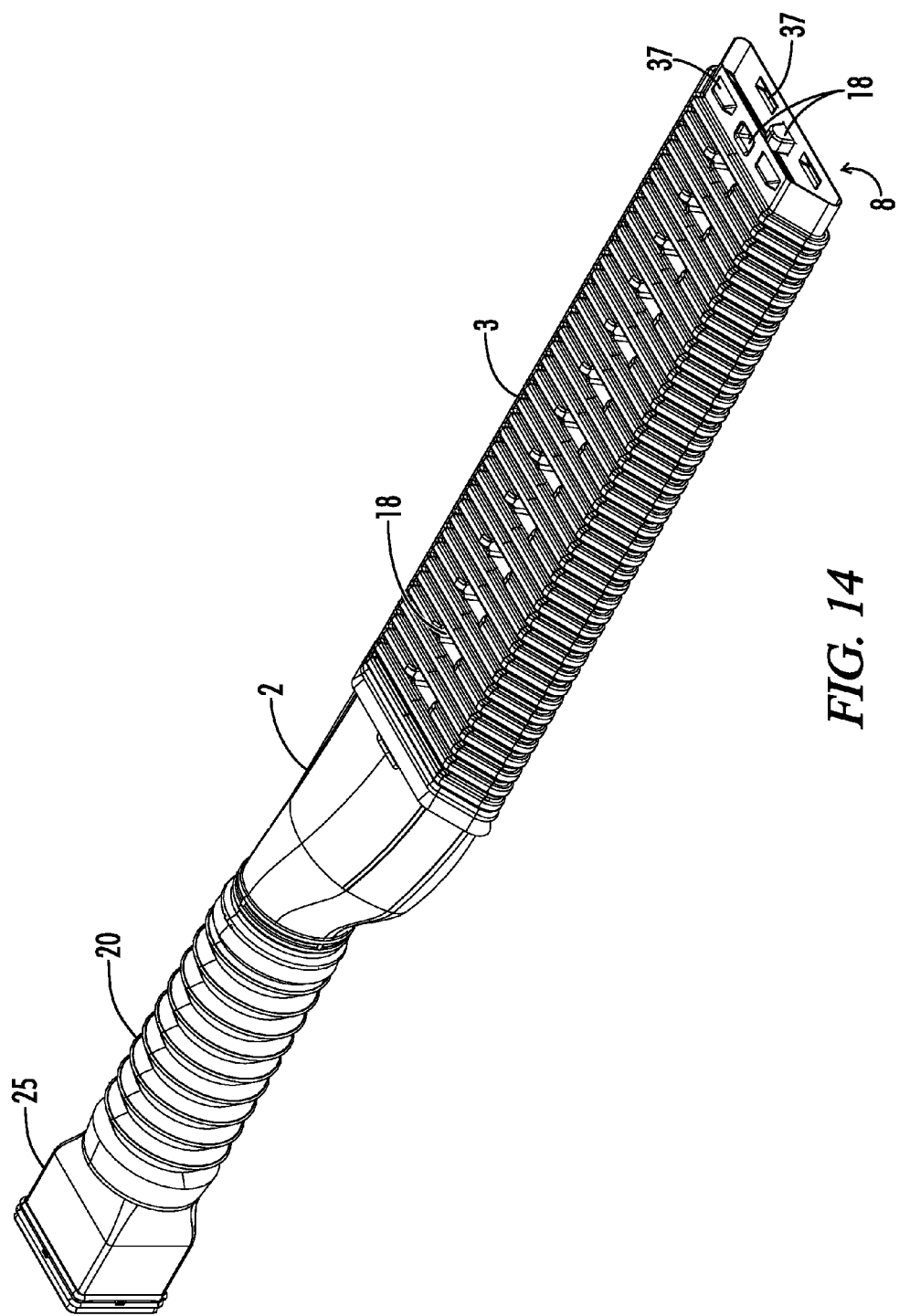
FIG. 14 is a perspective view of an alternate embodiment in accordance with the current disclosure showing an example of a corrugated duct with a single row of supports.
Figure 15:
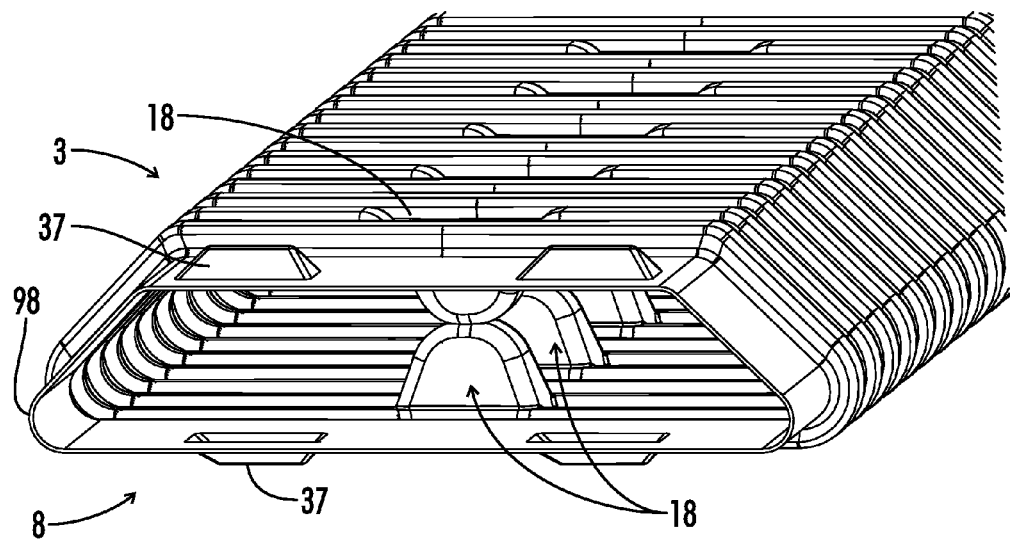
FIG. 15 is a partial perspective view of the corrugated duct shown in FIG. 14.
Figure 15A:
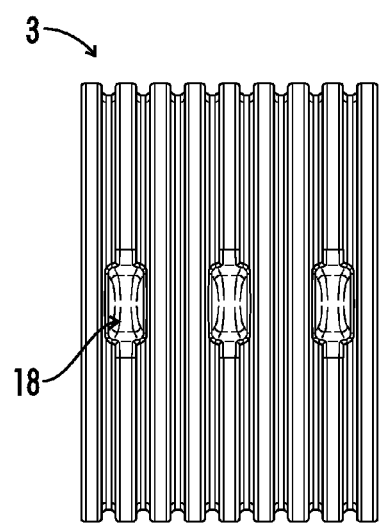
FIG. 15A is a partial top view of the corrugated duct shown in FIG. 15.
Figure 16:
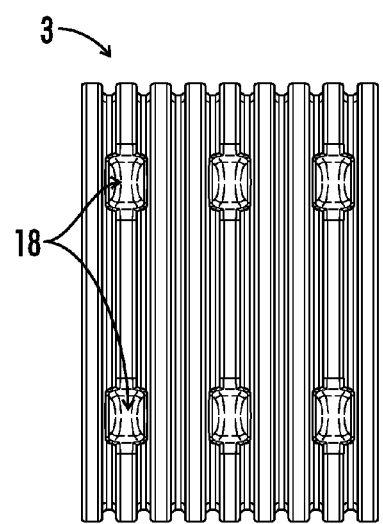
FIG. 16 is a partial top view showing an example of a corrugated duct with a two rows of supports.
Figure 19:
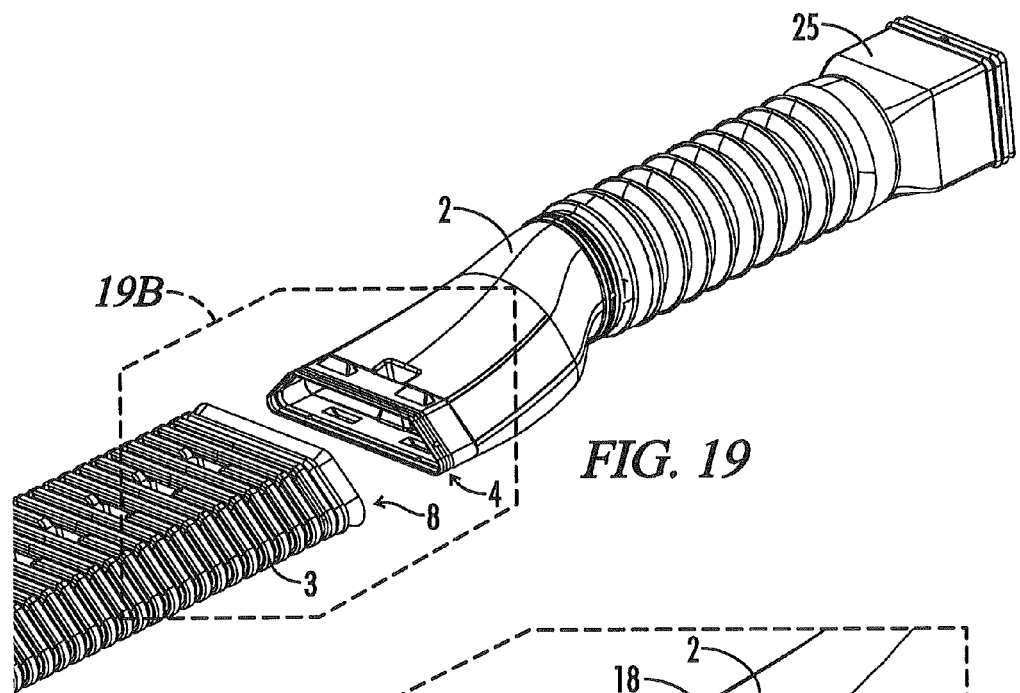
FIG. 19 is a partial perspective view showing an embodiment of a transition adapter and a corrugated duct in an unattached position.
Figure 19A:
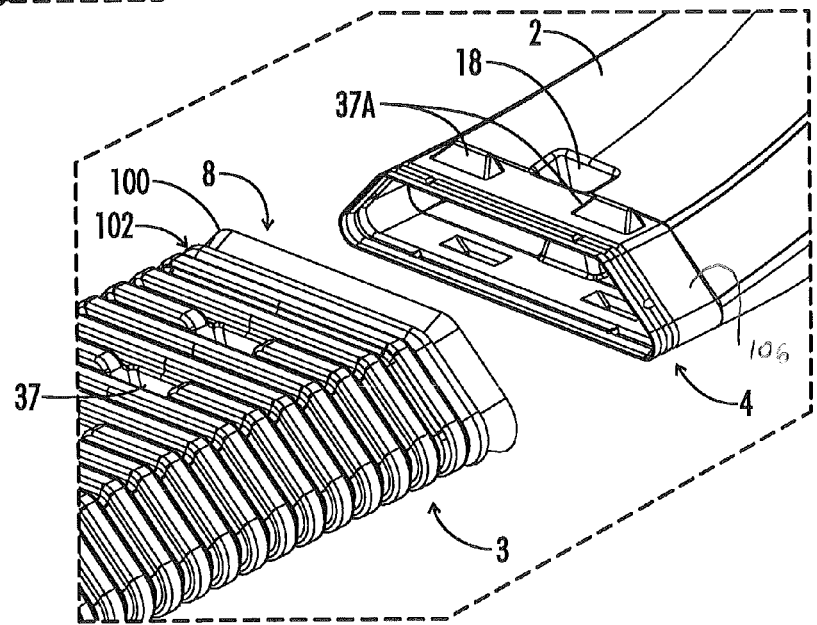
FIG. 19A is a partial perspective view of FIG. 19.
Figure 19B:
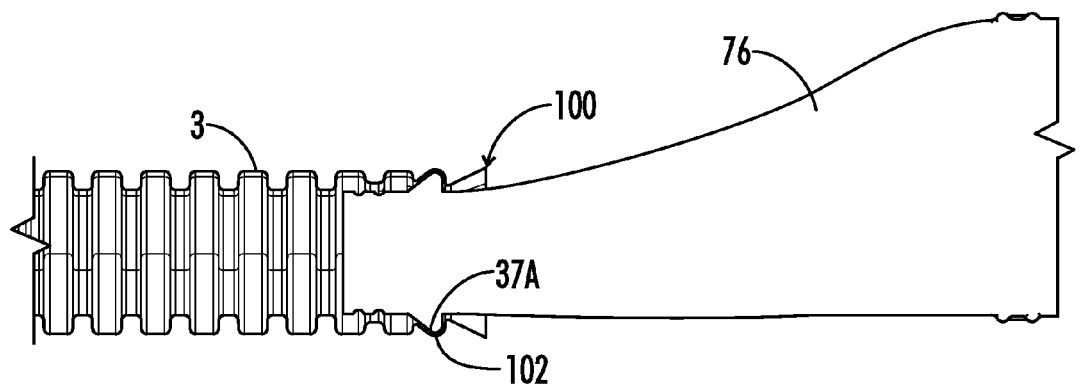
FIG. 19B is a partial cross-sectional view of the transition adapter and the corrugated duct shown in FIG. 19 in an attached position.
Figure 20:
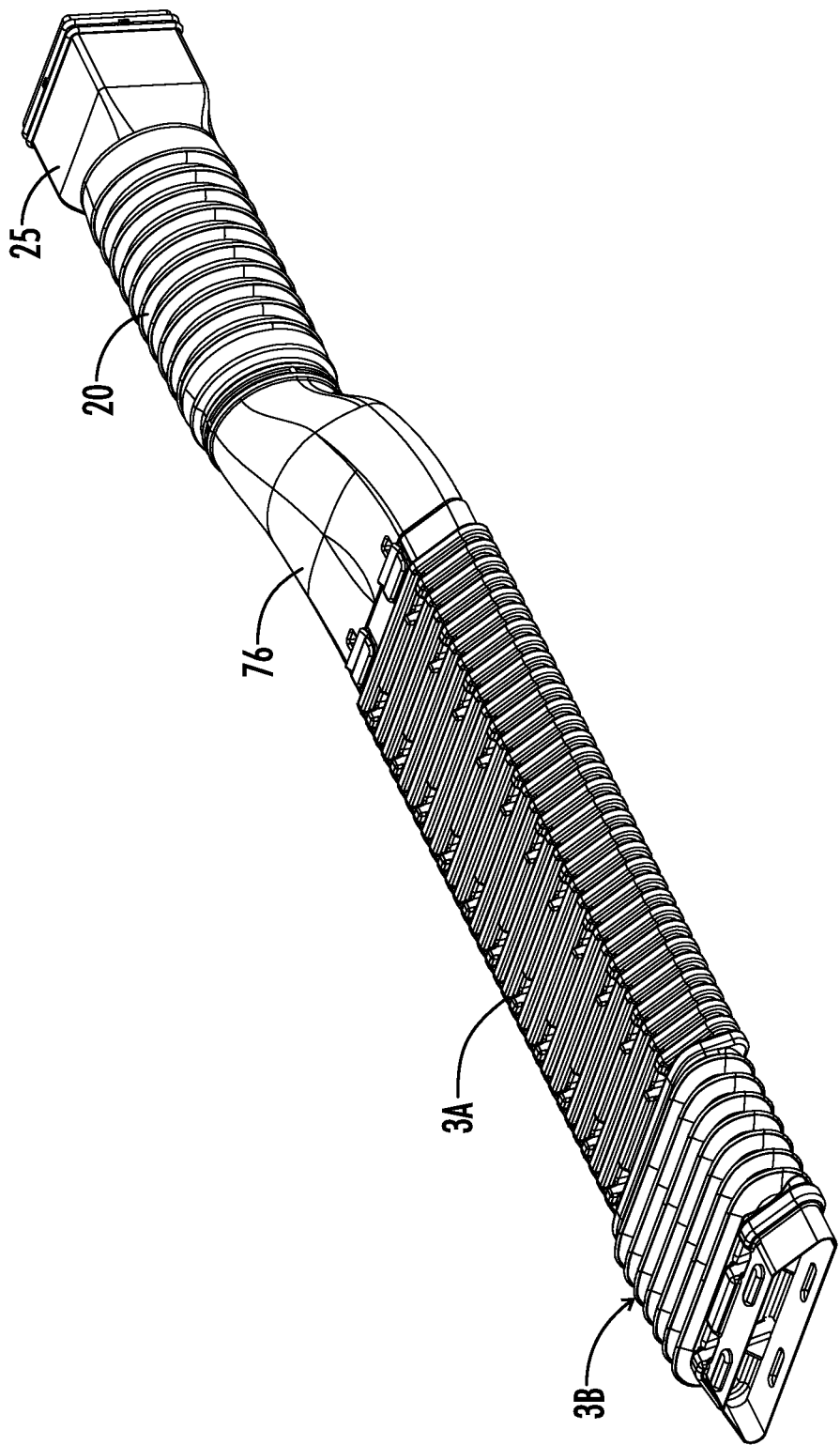
FIG. 20 is a perspective view showing an embodiment of a downspout connector, a transition adapter and a corrugated duct molded as a single piece.
Figure 21:
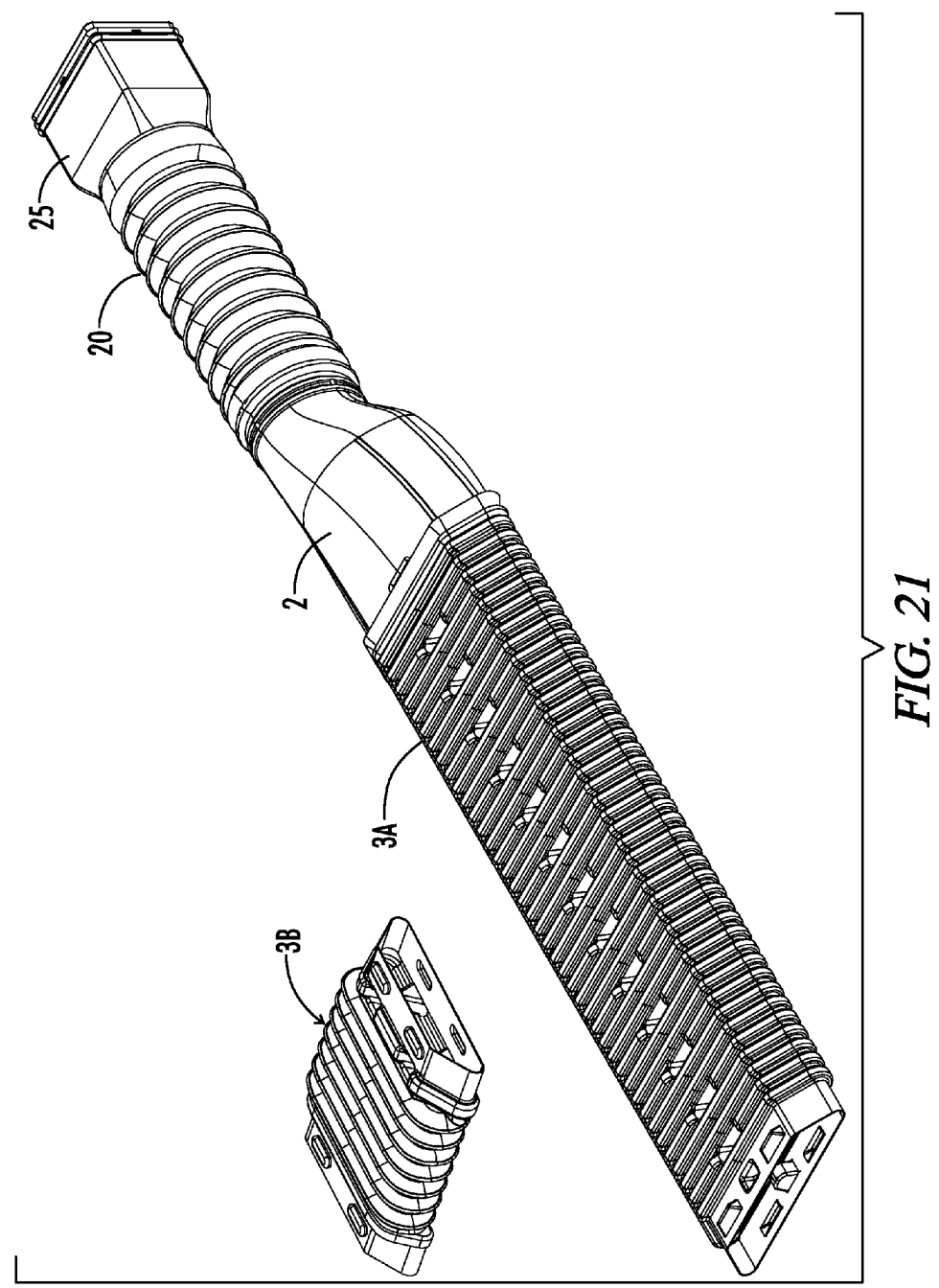
FIG. 21 is a perspective view showing an embodiment of a downspout connector, a transition adapter and a corrugated duct molded as at least two separate pieces.

FIG. 13 shows an embodiment of the draining apparatus 1 including a second transition adapter 55 that can be substantially similar to the first transition adapter 76. The second transition adapter 55 has a receiving end 66 and an output end 67 where the receiving end 66 can be connected to the corrugated duct second end 9. The second transition adapter output end 67 can be connected to a draining pipe 56 to allow fluid to be moved directly from the draining apparatus 1 into the draining pipe 56.

Thus, although there have been described particular embodiments of the present invention of a new and useful Low Profile Downspout Extension and Landscape Drainage Assembly it is not intended that such references be construed as limitations upon the scope of this invention except as set forth in the following claims.

What is claimed is:

1. A draining apparatus, comprising:
   a transition adapter having a receiving end for connection to a downspout, and having an exit end having a width and height, the exit end width being larger than the height of the exit end, wherein the transition adapter increases in width and decreases in height from the receiving end to the exit end; and
   an enclosed flowthrough duct having first and second ends, the first end comprising an inlet having a width and height, the inlet width and inlet height being such that one of the transition adapter exit end and the first duct end can be closely received within the other, and the second duct end comprising an outlet.

2. The apparatus of claim 1, wherein the width of the duct inlet is at least three times larger than the height of the duct inlet.

3. The apparatus of claim 1, wherein the duct has a length perpendicular to the inlet width and inlet height, the duct having a substantially uniform width and height throughout the duct length.

4. The apparatus of claim 1, wherein the duct is made of plastic.

5. The apparatus of claim 1, further comprising a flexible elbow duct having a first and second end, the first elbow duct end to be mated with a downspout exit end, and the second elbow duct end to be mated with the transition adapter receiving end.

6. The apparatus of claim 1, further comprising:
   a removable downspout adapter having a plurality of flexible attachment members, each attachment member having a first end connected to the removable downspout adapter and a second end having a hole for fastening the downspout adapter to the downspout;
   a downspout connecter having a first end and a second end, the first downspout connecter end configured to mate with the removable downspout adapter; and
   a flexible elbow duct having a first end and a second end, the first elbow duct end at the second downspout connecter end, and the second elbow duct end configured to mate with the transition adapter receiving end.

7. The apparatus of claim 1, wherein one of the duct first end and the duct second end can be closely received within the other to allow a plurality of ducts to be joined together.

8. The apparatus of claim 1, wherein the duct further comprises:
   a top portion, bottom portion, and two side portions, the two side portions creating a separation between the top portion and bottom portion; and
   a plurality of supports inside the duct to withstand vertical forces in order to maintain the separation between the duct top portion and the duct bottom portion.

9. The apparatus of claim 8, wherein the duct further comprises:
a plurality of accordion corrugation sections, each section being vertically and horizontally flexible to allow the section of the duct to be adjusted; and
at least one transverse non-collapsible rib being integral to the duct and adjacent to at least one accordion corrugation section to maintain the shape of the duct.

10. The apparatus of claim 9, wherein the supports are integrally formed with the at least one transverse non-collapsible rib.

11. A draining apparatus, comprising:
an enclosed flowthrough corrugated duct having first and second ends, the first end comprising an inlet and the second end comprising an outlet;
a transition adapter having a receiving end for connection to a downspout, and having an exit end, the exit end of the adapter and the first end of the duct being configured to allow one to be snugly received within the other;
the corrugated duct having a top portion, bottom portion, and two side portions, the two side portions creating a separation between the top portion and bottom portion; and
a plurality of supports inside the corrugated duct to withstand vertical forces in order to maintain the separation between the duct top portion and the duct bottom portion.

12. The apparatus of claim 11, wherein the supports are integrally formed with the corrugated duct.

13. The apparatus of claim 11, wherein the corrugated duct further comprises:
a plurality of accordion corrugation sections each having an adjustable length, each section being vertically and horizontally flexible to allow the corrugated duct section to be adjusted; and
a plurality of transverse non-collapsible ribs being integral to the corrugated duct to maintain the shape of the corrugated duct, the ribs separating the accordion corrugation sections.

14. The apparatus of claim 13, wherein the supports are integrally formed with the transverse non-collapsible ribs.

15. The apparatus of claim 14, wherein the accordion corrugation section adjustable length is less than 5 inches when the adjustable length is completely compressed.

16. The apparatus of claim 11, wherein the supports extend from the corrugated duct bottom portion.

17. The apparatus of claim 11, wherein the supports extend from the corrugated duct top portion.

18. The apparatus of claim 11, wherein the supports extend from the corrugated duct top portion and corrugated duct bottom portion, each top portion support complemented by an opposing bottom portion support.

19. The apparatus of claim 11, wherein the corrugated duct has a length and the supports are intermittently spaced along the corrugated duct length.

20. The apparatus of claim 19, wherein each support is intermittently spaced along the corrugated duct length with an interval length between each support, the interval length being less than 5 inches.

21. The apparatus of claim 19, wherein the supports are positioned in groups of at least two supports aligned with the corrugated duct width.

22. The apparatus of claim 11, wherein the supports allow the corrugated duct to withstand a pressure of at least 5.5 PSI without substantial plastic deformation.

23. The apparatus of claim 11, wherein the supports allow the corrugated duct to withstand a pressure of up to about 8.5 PSI without substantial plastic deformation.

24. The apparatus of claim 11, wherein each support can withstand a compression force of at least 75 lbs without substantial plastic deformation.

25. The apparatus of claim 11, wherein each support can withstand a compression force of up to 300 lbs without substantial plastic deformation.

26. The apparatus of claim 11, wherein the corrugated duct top portion has a width and the corrugated duct bottom portion has a width, the top portion width being less than the bottom portion width so that the side portions make an acute angle with the bottom portion.

27. A draining apparatus, comprising:
a corrugated duct having a first and second end, the corrugated duct comprising:
a top portion, bottom portion, and two side portions, the two side portions creating a separation between the top portion and bottom portion;
a plurality of accordion corrugation sections, each section being vertically and horizontally flexible to allow the section of the corrugated duct to be adjusted; and
at least one transverse non-collapsible rib being integral to the corrugated duct and adjacent to at least one accordion corrugation section to maintain the shape of the corrugated duct.

28. The apparatus of claim 27, wherein the corrugated duct further comprises a plurality of supports inside the corrugated duct to withstand vertical forces in order to maintain the separation between the duct top portion and the duct bottom portion.

29. The apparatus of claim 28, wherein the supports are integral with the at least one transverse non-collapsible rib.

30. The apparatus of claim 27, wherein the corrugated duct top portion has a width and the corrugated duct bottom portion has a width, the bottom portion width being greater than the top portion width so that the corrugated duct side portions make an acute angle with the bottom portion.

31. A method for draining, comprising:
attaching a transition adapter to a downspout, the transition adapter having an exit end, the exit end having a width and height, the exit width being greater than the exit height;
providing an enclosed flowthrough corrugated duct to receive fluid from the transition adapter exit end, the duct having an intake end and an outlet end, the duct intake end having a cross-section that allows one of the duct intake end and transition adapter exit end to fit snugly inside the other;
laying the corrugated duct across a surface, the duct having a top portion and bottom portion; and
supporting the duct internally to withstand vertical forces in order to maintain a separation between the duct top portion and the duct bottom portion.

32. A draining apparatus, comprising
an enclosed flowthrough corrugated duct including:
first and second opposite ends, the first end comprising an inlet adapted to receive water from a downspout connection, the second end comprising an outlet adapted to emit water received at the inlet, and
a top portion, bottom portion, and two side portions, the two side portions creating a separation between the top portion and bottom portion; and a plurality of supports inside the corrugated duct to withstand vertical forces in order to maintain the separation between the duct top portion and the duct bottom portion.

* * * * *